United States Patent [19]

Shlomo

[11] Patent Number: 5,502,922
[45] Date of Patent: Apr. 2, 1996

[54] PLANT HOLDER

[75] Inventor: Nevo Shlomo, Tel Aviv, Israel

[73] Assignee: N.C.A. Ltd., Or Yehuda, Israel

[21] Appl. No.: 237,624

[22] Filed: May 4, 1994

[30] Foreign Application Priority Data

May 4, 1993 [IL] Israel ............................................ 105601

[51] Int. Cl.$^6$ ...................................................... A01G 31/00
[52] U.S. Cl. ............................................................ 47/62; 47/39
[58] Field of Search .................................. 47/39, 39 C, 62

[56] References Cited

U.S. PATENT DOCUMENTS

| | | |
|---|---|---|
| 37,070 | 12/1862 | Crawford ............................................ 47/39 |
| 440,141 | 11/1890 | Dearborn . |
| 3,073,061 | 1/1963 | Pearson . |
| 3,137,095 | 6/1964 | Pearson . |
| 3,293,798 | 12/1966 | Johnson . |
| 3,451,622 | 6/1969 | Forney ............................................... 47/39 |
| 3,452,475 | 7/1969 | Johnson . |
| 3,772,827 | 11/1973 | Ware .................................................. 47/39 |
| 3,841,023 | 10/1974 | Carlyon . |
| 4,006,559 | 2/1977 | Carlyon . |
| 4,033,072 | 7/1977 | Kobayashi et al. . |
| 4,295,296 | 10/1981 | Kinghorn . |
| 4,302,906 | 12/1981 | Kawabe et al. . |
| 4,419,843 | 12/1983 | Johnson . |
| 4,676,023 | 6/1987 | Mori . |
| 4,736,543 | 4/1988 | Bertrab Erdmann . |
| 4,779,378 | 10/1988 | Mason . |
| 4,951,416 | 8/1990 | Gutridge . |
| 4,986,027 | 1/1991 | Harvey . |
| 5,136,807 | 8/1992 | Orlov . |
| 5,546,612 | 2/1896 | Doolittle ........................................... 47/39 |

FOREIGN PATENT DOCUMENTS

| | | | |
|---|---|---|---|
| 81090 | 10/1951 | Czechoslovakia ..................... | 47/39 |
| 0195220 | 9/1986 | European Pat. Off. . | |
| 2568448 | 2/1986 | France ................................... | 47/39 |
| 1031564 | 6/1958 | Germany . | |
| 2540038 | 3/1977 | Germany . | |
| 2822294 | 12/1979 | Germany . | |
| 3225263 | 2/1984 | Germany . | |
| 59261 | 9/1981 | Israel . | |
| 94686 | 10/1993 | Israel . | |
| 168677 | 4/1934 | Switzerland ........................... | 47/39 |
| 1496708 | 7/1989 | U.S.S.R. . | |
| 2173984 | 10/1986 | United Kingdom . | |

*Primary Examiner*—Terry Lee Melius
*Assistant Examiner*—Joanne C. Downs
*Attorney, Agent, or Firm*—Ladas & Parry

[57] ABSTRACT

A plant holder, including a base adapted to be supported on a horizontal surface, a vertically-extending column fixed to the base, a plurality of horizontally-extending containers mounted at different levels to the vertically-extending column, with each container adapted to receive a quantity of plant growing medium, and a pump for pumping water from the reservoir to the topmost container mounted to the column.

15 Claims, 5 Drawing Sheets

PLANT HOLDER

FIELD OF THE INVENTION

The present invention relates to plant holders, and particularly to holders for holding plants in a vertical manner for decorative purposes and/or for maximizing the use of available ground area for growing plants.

BACKGROUND OF THE INVENTION

In order to more fully exploit the available ground area for growing plants, e.g., in greenhouses, gardens, and the like, it has been proposed to grow the plants at a plurality of different levels. One technique developed for this purpose includes a vertical pipe filled with a plant growing medium and having walls pierced at various levels for accommodating the stems of the plants. Thus, the plant roots are located within the pipe and are nourished by the plant growing medium, water and fertilizer within the pipe, whereas the plant stems and fruit carried by the stems grow externally of the pipe. However, this technique was found unsatisfactory because of the lack of sufficient horizontal soil area, and also because of excessive soil compression at the lower levels.

Another system, described in U.S. Pat. No. 5,136,807, includes a plurality of containers stacked one on top of the other, with each container supporting the overlying containers but allowing open spaces between the side walls of the containers for growing the plants. Such an arrangement, however, also limits the amount of horizontal soil area available for plant growth and is subjected to excessive compression because of the weight of the overlying containers.

SUMMARY OF THE INVENTION

An object of the present invention is to provide another type of plant holder enabling plants to be grown at a plurality of vertical levels for optimizing available ground area, and/or for decorative purposes.

According to the present invention, there is provided a plant holder comprising: a base adapted to be supported on a horizontal surface; a reservoir mounted within the base and adapted to receive a quantity of water; a vertically-extending column fixed to the base; a plurality of horizontally-extending containers mounted at different levels along the vertically-extending column, with each container adapted to receive a quantity of plant growing medium; and a pump for pumping water from the reservoir to the topmost container mounted to the column. Each of the containers includes a drain opening for draining excess water therein to an underlying container in the column. The plant holder further includes a plurality of water-collector members each located under the drain opening of one container and over the upper end of an underlying container to direct the water from an overlying container to the underlying container. Each of the water-collector members may be rotatably mounted on the column to permit presetting its position on the column according to the relative positions of the overlying and underlying containers.

More particularly, in the described preferred embodiment, each of the water-collector members comprises a ring which may be rotatably mounted on the column. The ring has an upper end which is formed with a water inlet opening for at least a part of its circumference for receiving water drained from the overlying container, and a lower wall formed with an outlet opening for directing the water to the underlying container. The lower wall is formed with a slope for directing the water to the outlet opening.

According to further features in the described preferred embodiment, each of the containers is formed at its lower end with a step for receiving the water-collector ring. The step includes an upper wall spaced upwardly from the bottom wall of the container and formed with the drain opening alignable with the water inlet opening in the respective water-collector ring. Such a construction not only aids in stably supporting each container in cantilever fashion, but also assures that the excess water will be drained from the container a slight distance above the bottom wall of the container, to permit some excess water to remain in the container for supplying water to its plants should the water supply be terminated.

According to additional features in the described preferred embodiment, the column further includes a mounting means for mounting each of the containers in cantilever fashion to the column. The mounting means comprises a ring fixed to the column for each of the containers, and extensions carried by each of the containers engageable with their respective mounting rings for mounting the containers in cantilever fashion. Each of the containers includes a side wall formed with a cavity for receiving and partially enclosing the column. The extensions are carried at the upper end of the side wall to straddle the column, and are formed with depending flanges engaging the respective mounting ring for side-mounting the containers in cantilever fashion to the column.

A plant holder constructed in accordance with the foregoing features enables the plants to be grown at a plurality of different vertical levels while at the same time providing substantial horizontal soil area for growing the plants, and avoiding excessive soil compression particularly at the lower levels. Moreover, such a plant holder can include as many containers as may be desired, according to the space available, and can be assembled and disassembled in a quick and convenient manner whenever desired. The plant holder, therefore, can be used not only for maximizing available ground area, but also for decorative purposes to provide different decorative arrangements as may be desired.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF PREFERRED EMBODIMENTS

Figure 1:
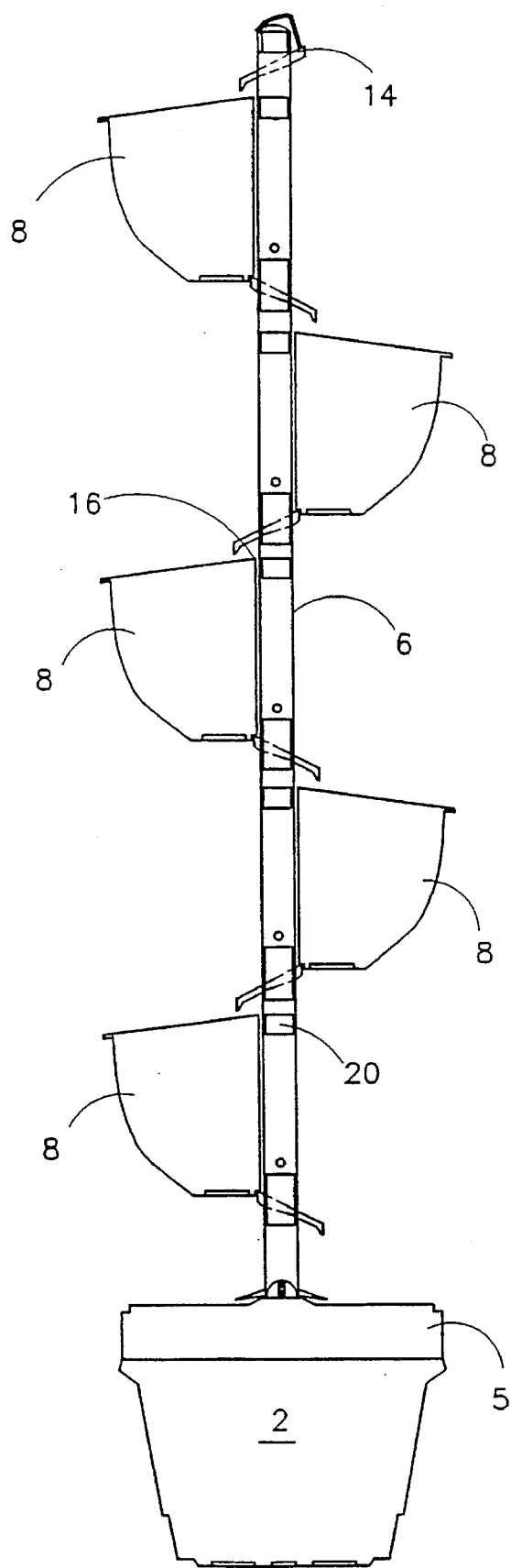
FIG. 1 illustrates one form of plant holder constructed in accordance with the present invention.
Figure 2:
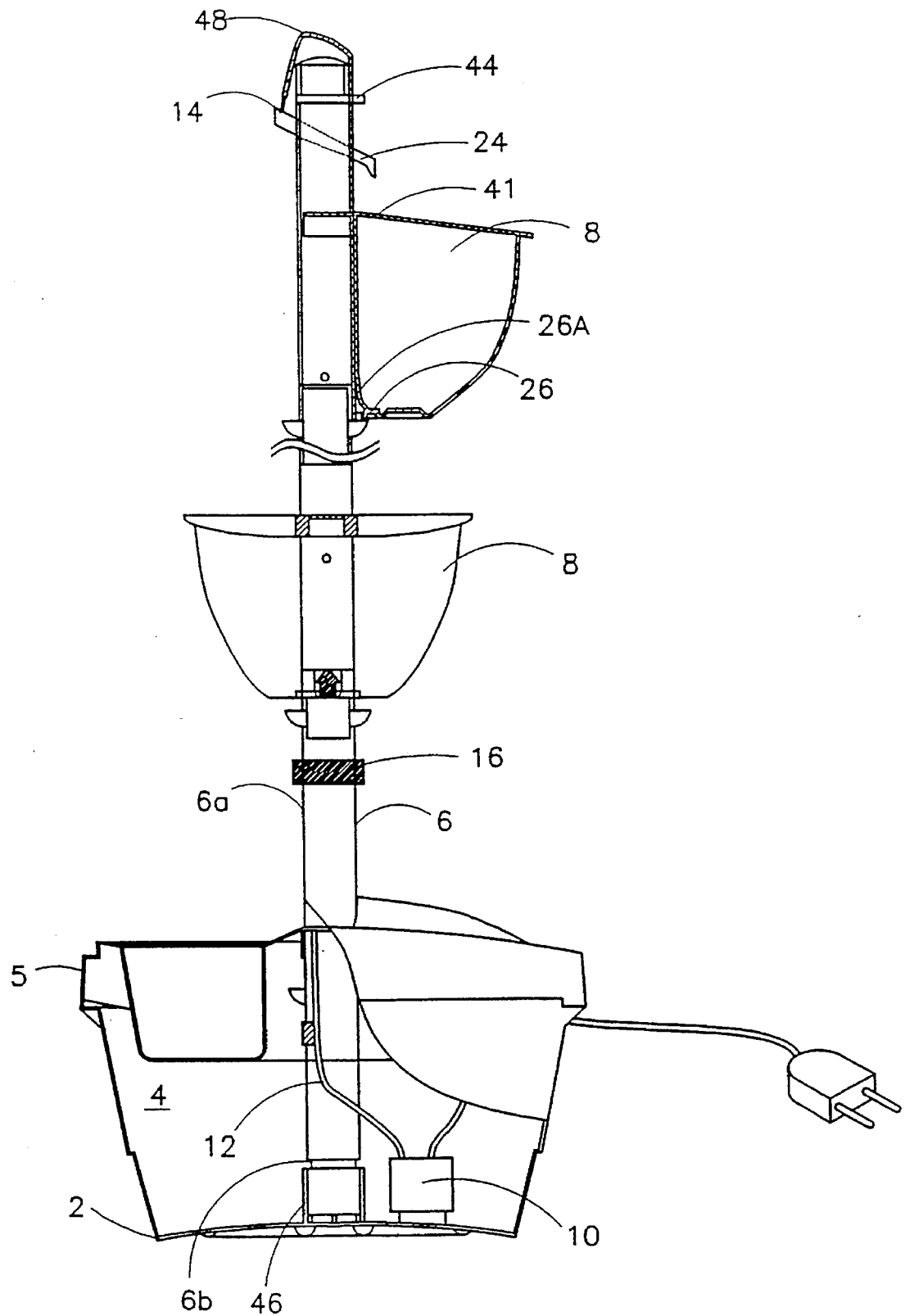
FIG. 2 is an enlarged fragmentary view more particularly illustrating the main components of the plant holder of FIG. 1.
Figure 3:
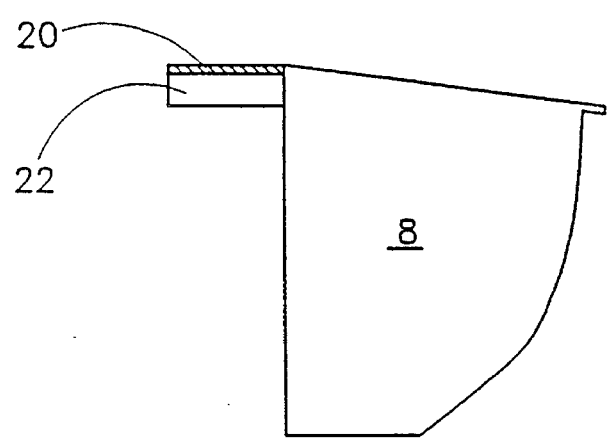
FIGS. 3, 4 and 5 are elevational, sectional and plan views, respectively, of one of the containers in the plant holder of FIGS. 1 and 2.
Figure 4:
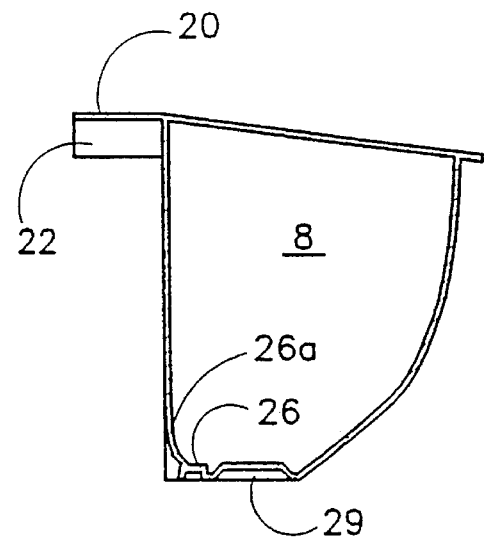

The plant holder illustrated in FIGS. 1 and 2 includes a base 2 adapted to be supported on any suitable horizontal surface, such as the ground in a greenhouse or back yard, or the floor of a room, porch or roof of a building. Base 2 is shown of generally cylindrical configuration but could be of any desired configuration, e.g., rectangular. It may be made of any suitable material, such as metal, plastic, ceramic or the like. It is formed with a reservoir 4 for holding a supply of water, to which may be added a fertilizer or other additive if desired.

Preferably base 2 is equipped with a cover 5 intended to prevent excessive evaporation. Preferably, cover 5 is formed with an annular depression generally torroidal in shape, suitable for holding a plant growing medium. In this case, additional plants can be grown in cover 5.

A vertically-extending column 6 is fixed to base 2 at the center of the base. Column 6 is of hollow cylindrical configuration, but may also be of rectangular or other polygonal configuration. It may be made of metal or plastic of sturdy construction since it is used for mounting a plurality of containers 8 at different vertical levels. Each of the containers 8 is mounted to column 6 in cantilever fashion. Each container 8 extends for only a part of the circumference of the vertical column 6, e.g., approximately one-half the circumference, and is side-mounted to the column to permit a container to be applied from the side at different vertical levels of the column.

Each container 8 is filled with a plant growing medium and is supplied with water (and fertilizer or other additive if desired) from reservoir 4 (FIG. 2) in base 2. For this purpose, the illustrated plant holder includes a pump 10 which may be submerged within the water in reservoir 4 and effective, when energized, to pump the water via a water feed tube 12 extending through the central column 6 to a nozzle 14 connected to the opposite end of feed tube 12. The nozzle is located at the top of column 6 to overlie the topmost container 8 supported by the column. As will be described more particularly below, each container 8 includes a drain which drains the excess water in the container to the underlying container, the drain of the bottommost container in the column draining the water into the reservoir 4.

Figure 5:
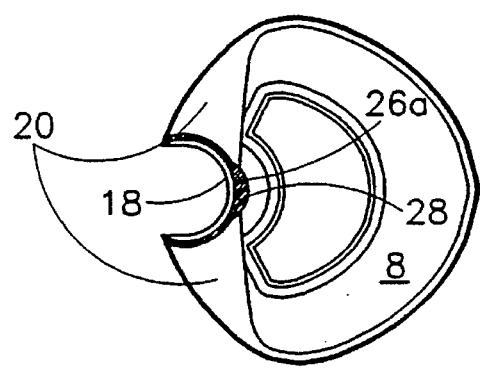

For purposes of mounting the containers 8 in cantilever fashion to the column 6, the column is provided with a plurality of mounting rings 16 fixed at different vertical levels. Each of the containers 8 includes a side wall formed with a semi-cylindrical cavity 18 (FIG. 5) for receiving and partially enclosing the respective part of column 6. The upper end of each container 8 is further formed with a pair of extensions 20 straddling column 6 and terminating in depending flanges 22 which engage the outer surface of the respective mounting ring 16. Such an arrangement enables each container 8 to be side-mounted to the vertical column 6 in a convenient manner and stably supports the container in cantilever fashion from the column.

As indicated earlier, each container 8 drains its excess water into the underlying container 8. For this purpose, the vertical column 6 further includes a plurality of water-collector rings 24, each located under the drain opening of the overlying container, and the upper end of the underlying container, for collecting the water draining from the overlying container and for directing it to the underlying container.

Each of the containers 8 is formed with a step 26 at its lower end which receives a water-collector ring 24. The upper wall 26a of each step 26 is formed with a plurality of drain openings 28 (FIG. 5) which overlie the upper open end of the respective water-collector ring 24.

It will thus be seen that the water is drained from each container 8 at a slight distance above its bottom wall 29 so that a quantity of water is retained in the container for watering its own plants should the supply of water from nozzle 14 be terminated. This arrangement also stably supports each container 8 in cantilever fashion from the vertical column 6.

Figure 6:
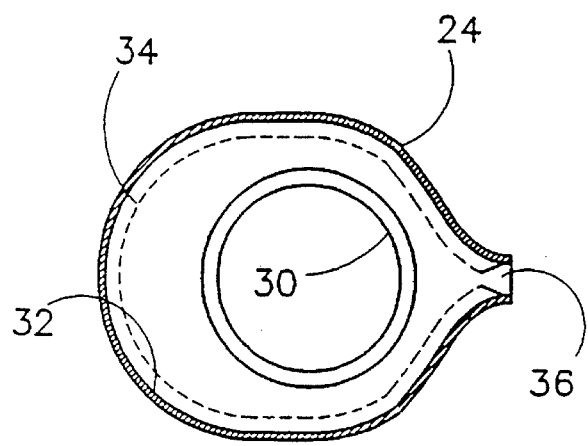
FIGS. 6 and 7 are plan and sectional views, respectively, of one of the water-collector rings included in the plant holder of FIGS. 1 and 2.
Figure 7:
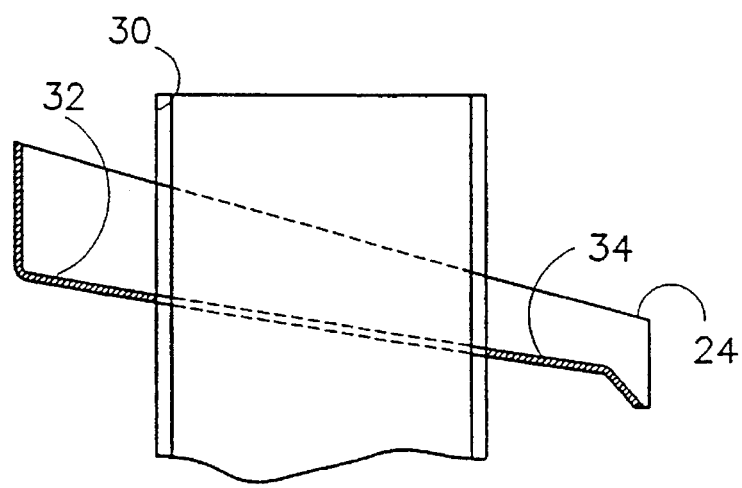

The construction of the water-collector ring 24 is more particularly illustrated in FIGS. 6 and 7. Thus, it includes an inner cylindrical wall 30 for receiving the cylindrical column 6, an outer cylindrical wall 32 for retaining the collected water, and a sloping bottom wall 34 for directing the collected water to an opening 36 formed at the lowermost point in the sloping bottom wall. Accordingly, the water draining from drain openings 28 (FIG. 5) of an overlying container 8 will be collected by the water-collector ring 24 and will be directed by its sloping bottom wall 34 to its outlet opening 36 for outletting to the upper end of the underlying container 8.

Figure 8:
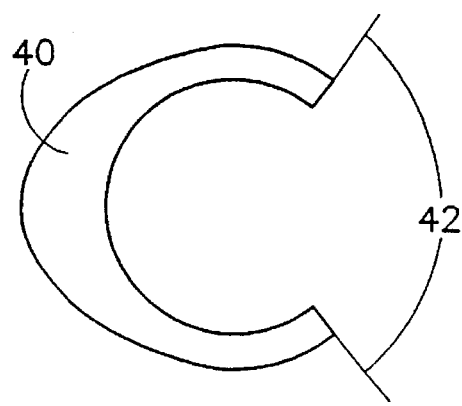
FIG. 8 is a plan view illustrating a cover for removably covering the upper ends of the water-collector rings illustrated in FIGS. 6 and 7.

The water-collector ring 24 is preferably covered by a cover, shown at 40 in FIG. 8, to inhibit algae growth. Cover 40 is formed with a large cutout 42 extending for a substantial part of the circumference of the water-collector ring 24 to define an enlarged inlet opening. Cover 40 is removable from the water-collector ring 24 to facilitate leaning.

The vertical column 6 is formed with a plurality of annular ribs 44, each for supporting one of the water-collector rings 24. Annular ribs 44 are of slightly larger diameter than that of the inner cylindrical wall 30 of the water-collector rings 24, and would therefore be hidden by the outer cylindrical wall 32 of the respective water-collector ring. For this reason, the annular ribs 44 are not seen in FIG. 2, except for the topmost annular rib 44 which has not received a water-collector ring 24 since there is no container 8 above it.

It will thus be seen that the water-collector ring 24 may be located at any angular position with respect to vertical column 6 in order to align its water inlet opening 41 with the drain openings 28 in the overlying container, and also to align its water outlet opening 36 with the open upper end of the underlying container 8.

As shown particularly in FIG. 2, the central vertical column 6 is made of a plurality of like sections 6a each of reduced diameter at one end 6b to enable the sections to be assembled in telescoping relation according to any desired length. Each section 6a is integrally formed with the annular rib 44 for receiving the water-collector ring 24 cooperable with the lower end of its overlying container 8, and with the mounting ring 16 for mounting the upper end of its respective container 8 in cantilever fashion, as described above. The sections are preferably attached to each other by a force-fit, with the reduced-diameter end 6b of one section being forcefully-fitted into the opposite end of the next section. The base 2 is formed with a central socket 46 for forcefully receiving the small-diameter end 6b of the lowermost section 6a. The topmost section of the column is closed by a removable cover 48 formed with an opening for receiving the upper end of the water feed tube 12.

The manner of assembling and using the illustrated plant holder will be apparent from the above description. Thus, the plant holder may be assembled to provide a central vertical column 6 as long as desired by forcefully attaching the appropriate number of column sections 6a. A water-collector ring 24 is first mounted on the annular rib 44 at the upper end of the respective section, and its open end is closed by its cover 40. The container 8 is then mounted in cantilever fashion to the overlying section 6a of the vertical column 6 by causing the extensions 20 at the upper end of the container to straddle the column over the mounting ring 6, and then moving down the container to cause the depending flanges 22 to engage the outer surfaces of the respective mounting ring. That column section 6a, including the container 8 mounted to it in cantilever fashion, is then force-fitted into the underlying section 6a such that the water-collector ring 24 of the underlying section is received within step 26 of the overlying container 8, with the drain openings 28 of the overlying container aligned with the water-inlet opening 42 in the water-collector ring. Thus, the water from the overlying container 8 drains via openings 28 into the water-collector ring 24 and is directed by the sloping wall 34 of that ring to its outlet opening 36 overlying the upper end of the underlying container 8 to drain into the underlying container.

Figure 9:
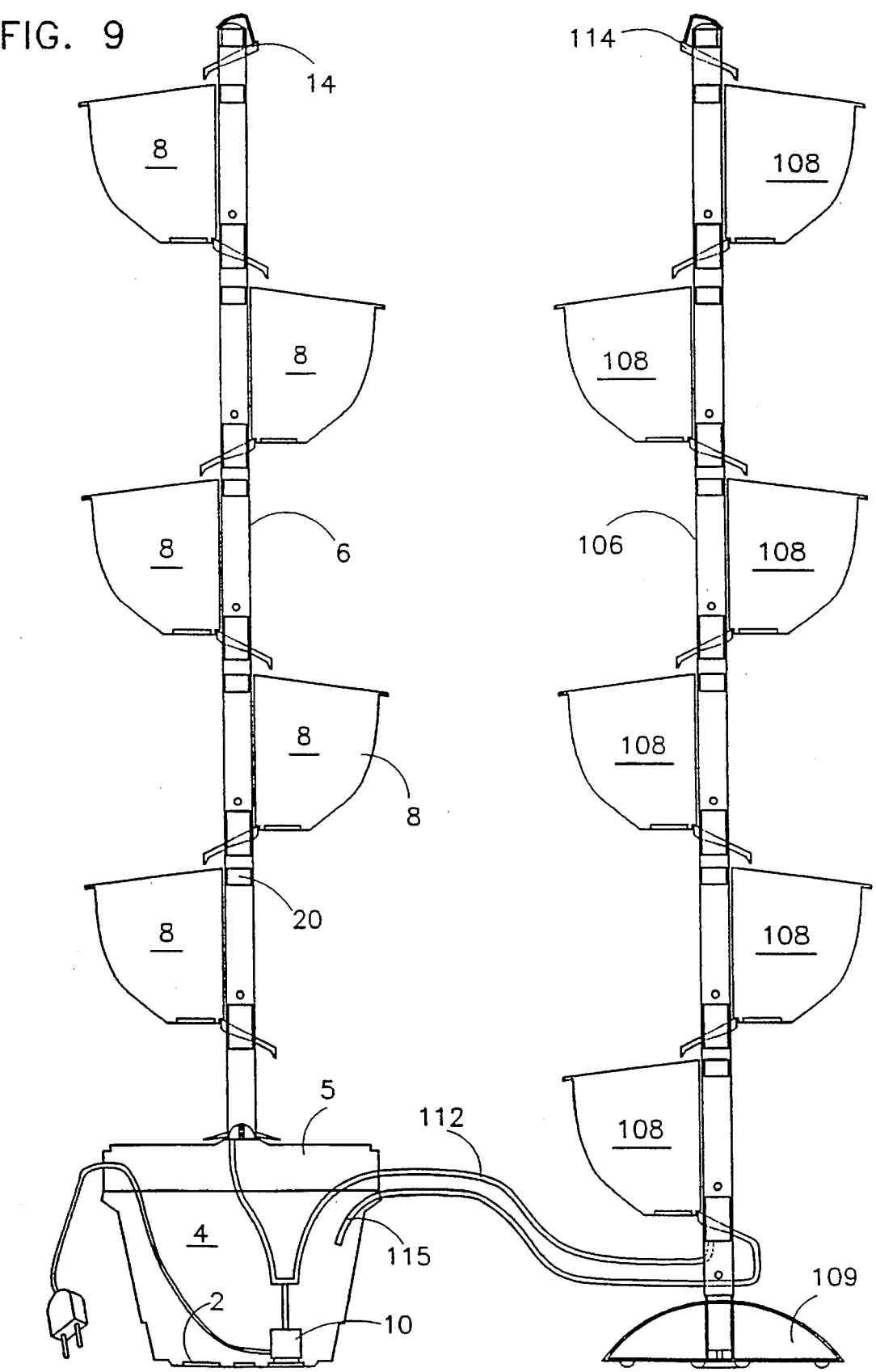
FIG. 9 illustrates another plant holder constructed in accordance with the present invention to include a plurality of vertical columns of plant containers.

FIG. 9 illustrates a further variation wherein the plant holder illustrated in FIG. 1 includes an additional vertically-extending column for mounting a further plurality of horizontally-extending containers at different levels. In FIG. 9, the plant holder, including its base 2, reservoir 4, vertical column 6, and containers 8, is constructed in the same manner as described above with respect to FIGS. 1–8, and therefore the same reference numerals are used for identifying corresponding parts.

The additional vertical column in the plant holder of FIG. 9 is indicated as 106, and the containers supported by that column are indicated at 108. Vertical column 106 is not supported by base 2 or within reservoir 4, but rather is supported by flat base 109 on the horizontal supporting surface (e.g., floor or ground). In this case, pump 10 within reservoir 4 of base 2 is also used for pumping water via an additional feed tube 112 to a nozzle 114 above the topmost container 108 in the additional vertical column 06.

The method of constructing vertical column 106, and the manner of mounting the containers 108 to it and of providing a drain from each container to the underlying container, are all the same as described above with respect to FIGS. 1–8, except that the water is drained from the lowermost container 108 via a water drain tube 115 directly into reservoir 4 of the base 2.

FIG. 9 illustrates only one additional vertical column 106 supplied with water from a common reservoir 4, but the system could include more than one additional column and more than one reservoir, each supplying water to one or more vertical columns of containers.

While the invention has been described with respect to two preferred embodiments, it will be appreciated that these are set forth merely for purposes of example, and that many other variations, modifications and applications of the invention may be made.

What is claimed is:

1. A plant holder, comprising:

a base adapted to be supported on a horizontal surface;

a reservoir mounted within said base and adapted to receive a quantity of water;

a vertically-extending column fixed to said base;

a plurality of horizontally-extending containers mounted at different levels along said vertically-extending column, with each container adapted to receive a quantity of plant growing medium;

a pump for pumping water from said reservoir to the topmost container mounted to said column;

each of said containers including a drain opening for draining excess water therein to an underlying container in the column;

and a plurality of water-collector members each located under the drain opening of one container and over the upper end of an underlying container to direct the water from an overlying container to the underlying container;

each of said water-collector members comprising a ring rotatably mounted on the column to permit presetting its position on the column according to the relative positions of said overlying and underlying containers;

each of said rings having an upper end which is formed with a water inlet opening for at least a part of the circumference for receiving water drained from the overlying container, and a lower wall formed with an outlet opening for directing the water to the underlying container.

2. The plant holder according to claim 1, wherein said lower wall is formed with a slope for directing the water to said outlet opening.

3. The plant holder according to claim 1, wherein the upper end of each of said water-collector members is closed by a cover formed with said water inlet opening for a part of its circumference.

4. The plant holder according to claim 1, wherein each of said containers is formed at its lower end with a step for receiving said water-collector member, said step including an upper wall spaced upwardly from the bottom wall of the container and formed with said drain opening alignable with the water inlet opening in the respective water-collector member.

5. The plant holder according to claim 1, wherein said column is formed with an annular rib for supporting said ring of the water-collector member.

6. The plant holder according to claim 1, wherein said column further includes a mounting means for mounting each of said containers in cantilever fashion to said column.

7. The plant holder according to claim 6, wherein said mounting means comprises a mounting ring fixed to the column for each of said containers, and extensions carried by each of said containers engageable with their respective mounting rings for mounting the containers in cantilever fashion.

8. The plant holder according to claim 1 and further comprising a cover adapted to cover said base.

9. The plant holder according to claim 8 wherein said cover is formed with a depression adapted to receive a quantity of plant growing medium.

10. A plant holder, comprising:

a base adapted to be supported on a horizontal surface;

a reservoir mounted within said base and adapted to receive a quantity of water;

a vertically-extending column fixed to said base;

a plurality of horizontally-extending containers mounted at different levels along said vertically-extending column, with each container adapted to receive a quantity of plant growing medium; and a pump for pumping water from said reservoir to the topmost container mounted to said column;

said column further including a mounting ring fixed to the column for each of said containers, and extensions carried by each of said containers engageable with their respective mounting rings for mounting the containers in cantilever fashion;

each of said containers including a side wall formed with a vertically-extending cavity for receiving and partially enclosing said column, said extension of each container being carried at the upper end of said side wall and located to straddle said column, said extension being formed with depending flanges engaging the respective mounting ring for side-mounting the respective container in cantilever fashion to the column.

11. The plant holder according to claim 10, wherein each of said containers includes a drain opening for draining excess water therein to an underlying container in the column.

12. The plant holder according to claim 11, wherein said column further includes a plurality of water-collector members, each being located under the drain opening of one container and over the upper end of an underlying container to direct the water from an overlying container to the underlying container.

13. The plant holder according to claim 10, wherein said column is located centrally of said base, said column being hollow and including a feed tube for feeding the water from the reservoir to the topmost container mounted to the column.

14. The plant holder according to claim 13, wherein said central column is formed of a plurality of tubular sections assembled together in telescoping relation.

15. A plant holder, comprising:

a base adapted to be supported on a horizontal surface;

a reservoir mounted within said base and adapted to receive a quantity of water;

a vertically-extending column fixed to said base;

a plurality of horizontally-extending containers mounted at different levels along said vertically-extending column, with each container adapted to receive a quantity of plant growing medium; and a pump for pumping water from said reservoir to the topmost container mounted to said column;

said plant holder further including at least one additional vertically-extending column mounting a further plurality of horizontally-extending containers at different levels therealong with each container also adapted to receive a quantity of a plant growing medium, and a feed tube from the pump in said reservoir to the topmost container in said additional vertically-extending column to which water is also pumped from said reservoir by said pump.

* * * * *